United States Patent
Neumann et al.

(10) Patent No.: US 10,017,401 B2
(45) Date of Patent: Jul. 10, 2018

(54) ALUMINUM-DOPED, IMINODIACETIC ACID GROUP-CONTAINING CHELATE RESINS

(71) Applicant: LANXESS Deutschland GmbH, Cologne (DE)

(72) Inventors: Stefan Neumann, Leverkusen (DE); Reinhold Klipper, Cologne (DE); Pavlos Makropoulos, Cologne (DE); Jenny Barbier, Hannover (DE); Maresa Schroeder, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/116,553

(22) PCT Filed: Feb. 4, 2015

(86) PCT No.: PCT/EP2015/052284
§ 371 (c)(1),
(2) Date: Aug. 4, 2016

(87) PCT Pub. No.: WO2015/118002
PCT Pub. Date: Aug. 13, 2015

(65) Prior Publication Data
US 2016/0347632 A1    Dec. 1, 2016

(30) Foreign Application Priority Data

Feb. 7, 2014 (EP) ..................................... 14154325

(51) Int. Cl.
| | | |
|---|---|---|
| *C08F 8/42* | (2006.01) | |
| *C02F 1/68* | (2006.01) | |
| *B01J 45/00* | (2006.01) | |
| *B01J 39/19* | (2017.01) | |
| *C02F 101/14* | (2006.01) | |
| *C02F 103/12* | (2006.01) | |
| *C02F 103/34* | (2006.01) | |

(52) U.S. Cl.
CPC ............... *C02F 1/683* (2013.01); *B01J 39/19* (2017.01); *B01J 45/00* (2013.01); *C08F 8/42* (2013.01); *C02F 2101/14* (2013.01); *C02F 2103/12* (2013.01); *C02F 2103/346* (2013.01); *Y02W 10/37* (2015.05)

(58) Field of Classification Search
None
See application file for complete search history.

(56) References Cited

U.S. PATENT DOCUMENTS

| | | | | |
|---|---|---|---|---|
| 3,395,197 A | * | 7/1968 | D Alelio | ............... C08F 255/02 204/157.82 |
| 4,260,652 A | * | 4/1981 | Taketani | ............... B01D 71/62 210/490 |
| 4,427,794 A | | 1/1984 | Lange et al. | |
| 5,109,074 A | * | 4/1992 | Eiffler | ...................... C08F 8/40 210/688 |
| 8,399,528 B2 | | 3/2013 | Klipper et al. | |
| 8,562,922 B2 | | 10/2013 | Klipper et al. | |
| 2002/0193454 A1 | * | 12/2002 | Lutjens | .................... B01J 45/00 521/32 |
| 2011/0132844 A1 | * | 6/2011 | Klipper | .................... B01J 45/00 210/687 |

FOREIGN PATENT DOCUMENTS

| | | |
|---|---|---|
| DE | 2801724 A1 | 7/1979 |
| DE | 3004058 A1 | 9/1981 |
| DE | 3129473 A1 | 2/1983 |

OTHER PUBLICATIONS

Prabhu, Desalination and Water Treatment, 52 (2014) 2527-2536 (published online May 2013) (Year: 2013).*
Luo, F. et al., The Removal of fluoride Ion by Using Metal (III)-Loaded Amberlite Resins, Solvent Extraction and Ion Exchange, vol. 22, 2004, Issue 2, pp. 305-322, Abstract.
Ku, Young, et al. "The Removal of Fluoride Ion from Aqueous Solution by a Cation Synthetic Resin", Separation Science and Technoogy, 37 (1), 2002, Marcel Dekker, Inc., pp. 89-103.
Loganathan, Paripurnanda, et al., "Defluoridation of drinking water using adsorption processes", Journal of Hazardous Materials, 248-249, 2013, Elsevier, pp. 1-19.
International Search Report from International Application No. PCT/EP2015/052284, dated Jun. 22, 2015, two pages.

* cited by examiner

*Primary Examiner* — Robert C Boyle

(57) ABSTRACT

The present invention relates to aluminum-doped chelate resins containing iminodiacetic acid groups, to a production process for aluminum-doped chelate resins containing iminodiacetic acid groups, and to a device comprising at least one layer of at least one aluminum-doped chelate resin containing iminodiacetic acid groups, and to the uses of this device and of the chelate resins for removal of fluoride from water.

14 Claims, No Drawings

ALUMINUM-DOPED, IMINODIACETIC ACID GROUP-CONTAINING CHELATE RESINS

The present invention relates to aluminum-doped chelate resins containing iminodiacetic acid groups, to a production process for aluminum-doped chelate resins containing iminodiacetic acid groups, to a device comprising at least one layer of at least one aluminum-doped chelate resin containing iminodiacetic acid groups, and to the uses of this device and of the chelate resins for removal of fluoride from water.

Fluoride is a trace element which is ubiquitous in our environment. Moreover, it occurs as a waste product in the industrial production of ceramics or porcelain or in the semiconductor and solar industries. Because of the existing production processes, it is frequently disposed of with the wastewater. Natural deposits can likewise lead to pollution of the water by fluoride.

The removal of fluoride from water becomes necessary when the water has too high a fluoride concentration. Although fluoride is an important trace element to man and serves to strengthen the bones and teeth, it has toxic properties in the case of elevated absorption over a prolonged period and can lead to bone and tooth diseases such as osteosclerosis or fluorosis. There is also the suspicion of carcinogenicity. In Germany, according to drinking water regulations, fluoride ions may be present up to a concentration of 1.5 ppm (mg/L) in drinking water. The guideline value of the World Health Organization (WHO) for fluoride in drinking water is also 1.5 ppm (mg/L).

Conventional methods of removing fluoride from wastewater, such as the precipitation by addition of calcium chloride known from DE-A 2801724 or the adsorption of fluoride on activated alumina known from DE-A 3004058, are suitable only to a limited degree, if at all, for drinking water treatment. Our experience has shown that it is possible by precipitation, even with considerable excesses of precipitant, to attain only concentrations of 3 to 10 ppm fluoride, which is still well above the required limit of 1.5 ppm. The adsorption of fluoride on activated alumina is likewise unsuitable for drinking water treatment, since the capacities are very sensitive to the water composition. Moreover, the pH of the water released is affected and the aluminum oxide grains of the activated alumina release aluminum to the water treated, which means that the aluminum limit of 0.2 ppm required in the German drinking water regulations can easily be exceeded.

A further method of removing fluorides from water, in which the fluorides are precipitated with the aid of sodium aluminate, is known from DE-A 3129473. A disadvantage of this method is likewise that the water still has excessively high fluoride concentrations.

In addition, "Solvent Extraction and Ion Exchanger", vol. 22, no. 2, pp. 305-322, 2004, discloses aluminum-doped amberlite resins which are utilized for fluoride removal but have the disadvantage of likewise releasing excessively high amounts of aluminum ions and have too low a fluoride absorption capacity.

A feature common to the known chelate resins is that their fluoride capacities are too low and they cannot therefore be used efficiently. In addition, they can contain toxic substances.

There was therefore still a need for a chelate resin for fluoride removal, with which the disadvantages of the prior art are overcome.

It has now been found that, surprisingly, an aluminum-doped chelate resin containing iminodiacetic acid groups efficiently removes fluoride from water.

The invention therefore provides an aluminum-doped chelate resin containing iminodiacetic acid groups and containing functional groups of the formula (I)

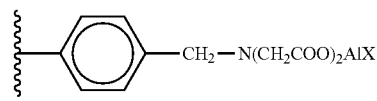

(I)

where $\sim\!\!\sim\!\!\sim$ represents the polymer skeleton and X is any monovalent anion, having a first substitution level by phthalimidomethyl groups of 0.6 to 1.5 and a functionalization level of the amino groups with acetic acid groups of 1.4 to 1.65.

X may, for example, be nitrate, nitrite, hydrogensulfate, hydrogencarbonate or a halide. X is preferably chloride.

In addition, the invention encompasses a production process for the aluminum-doped chelate resins of the invention, containing iminodiacetic acid groups and containing functional groups of the formula (I)

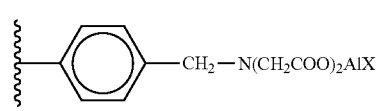

(I)

where $\sim\!\!\sim\!\!\sim$ represents the polymer skeleton and X is any monovalent anion, having a first substitution level by phthalimidomethyl groups of 0.6 to 1.5 and a functionalization level of the amino groups with acetic acid groups of 1.4 to 1.65, in which a.) the monomer droplet composed of at least one monovinylaromatic compound and at least one polyvinylaromatic compound and at least one porogen and at least one initiator are converted to a crosslinked bead polymer, b.) the crosslinked bead polymer from step a) is phthalimidomethylated with phthalimide derivatives and the phthalimide derivative is used in this reaction in a ratio of 0.7 mol to 1.7 mol per mole of bead polymer, c.) the phthalimidomethylated bead polymer from step b) is converted to aminomethylated bead polymer and d.) the aminomethylated bead polymer from step c) are reacted with chloroacetic acid or salts thereof to give chelate resins having iminodiacetic acid groups having a functionalization level of the amino groups with acetic acid groups of 1.4 to 1.65 and the molar ratio of chloroacetic acid or salts thereof is 1.8:1 to 2.5:1 based on the amount of the aminomethylated bead polymer used and e.) the chelate resin containing iminodiacetic acid groups from step d) is contacted with an aluminum salt solution of a trivalent aluminum ion.

The scope of the invention encompasses all parameters and elucidations above and detailed hereinafter, in general terms or within areas of preference, together with one another, i.e. including any combinations between the respective areas and areas of preference.

For the purposes of the present invention, the monovinylaromatic compounds preferably used in step a) of the process are monoethylenically unsaturated compounds, more preferably styrene, vinyltoluene, ethylstyrene, α-methylstyrene, chlorostyrene, chloromethylstyrene, alkyl acrylates or alkyl methacrylates.

Especial preference is given to employing styrene or mixtures of styrene with the aforementioned monomers.

For the purposes of the present invention, preferred polyvinylaromatic compounds for process step a) are multifunctional ethylenically unsaturated compounds, more preferably divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate or allyl methacrylate, especially preferably divinylbenzene.

The polyvinylaromatic compounds are preferably used in amounts of 1%-20% by weight, more preferably 2%-12% by weight, especially preferably 4-10% by weight, based on the monomer or mixture thereof with other monomers. The nature of the polyvinylaromatic compounds (crosslinkers) is selected with regard to the subsequent use of the polymer beads. In the case of use of divinylbenzene, commercial qualities of divinylbenzene also comprising ethylvinylbenzene as well as the isomers of divinylbenzene are adequate. A preferred embodiment of the present invention employs microencapsulated monomer droplets in process step a).

Useful materials for the microencapsulation of the monomer droplets are those known for use as complex coacervates, especially polyesters, natural and synthetic polyamides, polyurethanes or polyureas.

Gelatin is a natural polyimide used with preference. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The optionally microencapsulated monomer droplets contain at least one initiator or mixtures of initiators to induce the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tea-amylperoxy-2-ethylhexane, and also azo compounds such as 2,2'-azobis(isobutyronitrile) or 2,2'-azobis(2-methylisobutyronitrile).

The initiators are preferably used in amounts of 0.05% to 2.5% by weight, more preferably 0.1% to 1.5% by weight, based on the monomer mixture.

Preference is given to using porogens in order to produce a macroporous structure in the polymer beads. Suitable porogens include organic solvents that are poor solvents and/or swellants for the polymer formed. Examples of these are hexane, octane, isooctane, isododecane or octanol and isomers thereof.

The performance of process step a) is sufficiently well known to those skilled in the art, for example from EP-A 2305382.

According to the present invention, the chelate resins may be obtained either in heterodisperse particle size distribution or in monodisperse particle size distribution.

A monodisperse crosslinked bead polymer is obtained in process step a) by conducting the conversion in process step a) by the jetting method or by the seed/feed method. Both process steps are known from the prior art and are described, for example, in EP-A 2259874. The disclosure for these two steps from EP-A 2259874 is incorporated into the present description via the reference to this application.

In the present application, monodisperse materials are those in which at least 90% by volume or % by mass of the particles have a diameter within ±10% of the most common diameter.

For example, in the case of a material having a most common diameter of 0.5 mm, at least 90% by volume or % by mass is within a size range between 0.45 mm and 0.55 mm; in the case of a material having a most common diameter of 0.7 mm, at least 90% by volume or % by mass is within a size range between 017 mm and 0.63 mm.

Preference is given to producing monodisperse aluminum-doped chelate resins containing iminodiacetic acid groups.

Process step b) can be conducted, for example, by first preparing the amidomethylating reagent and then adding R to the product from process step a). Process step b), however, can likewise be conducted in the form of a one-pot reaction in which the product from process step a) is reacted with a phthalimide derivative and a condensed formaldehyde, for example and with preference paraformaldehyde.

Preferably, process step b) is conducted by first preparing the amidomethylating reagent and then adding it to the product from process step a). This is a phthalimide derivative that is dissolved in a solvent and admixed with formalin. Subsequently, a bis(phthalimido) ether is then formed from this mixture, with elimination of water. Where appropriate, the bis(phthalimido) ether can be converted to the phthalimido ester. Preference is given to using the bis(phthalimido) ether. Preferred phthalimide derivatives in the context of the present invention are phthalimide or substituted phthalimides, for example and with preference methylphthalimide. Particular preference is given to using phthalimide as phthalimide derivative.

The molar ratio of the phthalimide derivatives to the bead polymers in process step b) is 0.7:1 to 1.7:1. Preferably, the phthalimide derivative is used in a molar ratio of 0.7:1 to 1.35:1 in process step b). Most preferably, 0.8 mol to 1.0 mol of phthalimide derivative is used per mole of bead polymer in process step b).

Formalin is typically used in excess based on phthalimide derivative, but it is also possible to use different amounts. Preference is given to using 1.01 to 1.2 mol of formalin per mole of phthalimide derivative. Very particular preference is given to using 1.03 to 1.07 mol of formalin per mole of phthalimide derivative.

Solvents used in step b) of the process are inert solvents suitable for swelling the polymer, preferably chlorinated hydrocarbons, more preferably dichloroethane or methylene chloride.

In process step b), the bead polymer is condensed with phthalimide derivatives. The catalyst used here is oleum, sulfuric add or sulfur trioxide, in order to prepare an $SO_3$ adduct of the phthalimide derivative in the inert solvent therefrom. In process step b), the catalyst is typically added in deficiency relative to the phthalimide derivative, although it is also possible to use greater amounts. Preferably, the molar ratio of the catalyst to the phthalimide derivatives is between 0.1:1 and 0.45:1. More preferably, the molar ratio of the catalyst to the phthalimide derivatives is between 0.2:1 and 0.4:1.

The temperature on addition of the catalyst to the bead polymer and the $SO_3$ adduct of the phthalimide derivative should preferably be below <45'C, more preferably between 5 to 30° C.

Process step b) can be conducted at a wide variety of different temperatures depending on the solvent. In general, the reaction is conducted at 40° C. to 80° C., but it is likewise possible to choose other temperatures. Preferably, process step b) is conducted at 60° C. to 80° C. Typically, the mixture is stirred for 1 to 15 hours. However, the mixture can also be stirred for a longer or shorter period. Preferably, the reaction in process step b) is stirred for 6 to 10 hours.

The process of the invention can achieve any first substitution level between 0.6 and 1.5 phthalimidomethyl groups based on the unsubstituted aromatic radicals. In the present application, first substitution level is understood to mean the mean number of phthalimidomethyl groups per aromatic radical, based on the sum total of the substituted and unsubstituted aromatic radicals. A first substitution level of 1.1 means, for example, that 1 hydrogen atom on the aromatic radical has been replaced by a phthalimidomethyl group and that, in addition, every tenth aromatic radical has been disubstituted. Preferably, the first substitution level by phthalimidomethyl groups is between 0.6 to 1.2 and more preferably between 0.7 and 0.9.

The cleavage of the phthalic acid radical and thus the liberation of the aminomethyl group takes place in process step c) through treatment of the phthalimidomethylated crosslinked bead polymer with aqueous or alcoholic solutions of an alkali metal hydroxide, such as sodium hydroxide or potassium hydroxide, at temperatures of 100 to 250° C., preferably of 120 to 190° C. The concentration of the sodium hydroxide solution is in the range from 10% to 50% by weight, preferably from 20% to 40% by weight.

The resultant aminomethylated bead polymer is finally washed with demineralized water until free from alkali metal.

In process step d), the chelate resins of the invention are prepared by reacting the crosslinked vinylaromatic bead polymer containing aminomethyl groups in aqueous suspension with chloroacetic acid or salts thereof, for example and with preference the lithium, sodium, potassium, calcium and magnesium salts. An especially preferred chloroacetic acid salt is the sodium salt of chloroacetic acid.

The sodium salt of chloroacetic add is preferably used as an aqueous solution. Particular preference is given to using an aqueous chloroacetic add with 60% by weight to 85% by weight.

The aqueous solution of the sodium salt of chloroacetic add or the aqueous chloroacetic add is generally metered into the initially charged aqueous suspension of the bead polymer containing aminomethyl groups at the reaction temperature within 0.5 to 15 hours. Preference is given to metered addition within 5 to 11 hours.

The hydrochloric add released in the reaction of the bead polymers containing aminomethyl groups with chloroacetic add is partly or fully neutralized by addition of sodium hydroxide solution, such that the pH of the aqueous suspension in this reaction is set within the range between pH 7 to 11.5. Preferably, the reaction is conducted at pH 8 to 10.

Process step d) is typically conducted at temperatures in the range between 50° C. and 100° C. However, it is also possible to choose temperatures outside this range. Preference is given to effecting the reaction at temperatures in the range between 80° C. and 95° C.

The molar ratio of the chloroacetic add derivative to the bead polymer containing aminomethyl groups is between 1.8:1 and 2.5:1.

The suspension medium used is water or aqueous salt solution. Useful salts include alkali metal salts, especially NaCl and sodium sulfate.

The reaction of the invention can achieve a functionalization level between 1.4 and 1.85 based on the hydrogen atoms in the amino groups that have been replaced by acetic add groups. A functionalization level of 1.5 means, for example, that, statistically, both hydrogen atoms in every second amino group have been replaced by acetic add groups.

In process step e), the chelate resins of the invention are doped by reaction with aluminum salt solutions to prepare the aluminum-doped chelate resin containing iminodiacetic add groups. Suitable aluminum salt solutions used may be any solutions of trivalent aluminum salts. In general, salts of trivalent aluminum with strong adds are used, for example aluminum chloride, aluminum nitrate, aluminum sulfate, aluminum bromide or aluminum iodide, or the hydrates and solvates thereof. Preference is given to using aluminum chloride to dope the chelate resin containing iminodiacetic add groups. Preference is given to using water as solvent for the aluminum salts. Preference is given to using aqueous solutions.

The amount of aluminum used for doping is generally between 2 to 6 mol of aluminum, based on one liter of chelate resin containing iminodiacetic acid groups used. However, the amount of aluminum ions used may also be outside this range. Preferably, the amount of aluminum used for doping is between 5 to 7 mol per liter of chelate resin containing iminodiacetic acid groups used.

Preference is given to using monodisperse aluminum-doped chelate resins containing iminodiacetic acid groups.

The aluminum-doped chelate resin of the invention, containing iminodiacetic add groups, is particularly suitable for removing fluoride from water.

The aluminum doped chelate resins containing iminodiacetic add groups may contain different amounts of aluminum. In general, the aluminum-doped chelate resins containing iminodiacetic add groups contain 10 to 50 grams of aluminum per liter of resin. Preferably, the aluminum-doped chelate resins containing iminodiacetic acid groups contain 25 to 35 grams of aluminum per liter of resin.

The fluoride capacity of the aluminum-doped chelate resin containing iminodiacetic acid groups of fluoride is generally and preferably between 1 to 30 g per liter of chelate resin used.

Especially in the case of a high total salt content of the water (>10 meq/L), it has been found that very particularly aluminum-doped chelate resins containing iminodiacetic acid groups and having a first substitution level by phthalimidomethyl groups between 0.7 to 0.9 and a functionalization level of the amino groups by acetic acid groups of 1.4 to 1.65 have a particularly high affinity for fluoride ions.

Preference is given to aluminum-doped chelate resins containing iminodiacetic add groups and having a first substitution level by phthalimidomethyl groups of 0.6 to 1.2 and a functionalization level of the amino groups by acetic acid groups of 1.4 to 1.65, which are prepared by a) converting monomer droplets composed of at least one monovinylaromatic compound and at least one polyvinylaromatic compound and at least one porogen and at least one initiator to a crosslinked bead polymer,
b) phthalimidomethylating the cross/inked bead polymer from step a) with phthalimide derivatives and using the phthalimide derivative in this reaction in a ratio of 0.7 mol to 1.35 mol per mole of bead polymer,
c) converting the phthalimidomethylated bead polymer from step b) aminomethylated bead polymer and
d) reacting the aminomethylated bead polymer from step c) with chloroacetic acid or salts thereof to give chelate resins having iminodiacetic acid groups having a functionalization level of the amino groups with acetic add groups of 1.4 to 1.65 and the molar ratio of chloroacetic acid or salts thereof being 1.8:1 to 2.5:1 based on the amount of the aminomethylated bead polymer used.

Particular preference is given to aluminum-doped chelate resins containing iminodiacetic add groups and having a first substitution level by phthalimidomethyl groups of 0.7 to 0.9 and a functionalization level of the amino groups by acetic add groups of 1.4 to 1.85, which are prepared by a) converting monomer droplets composed of at least one monovinylaromatic compound and at least one polyvinylaromatic compound and at least one porogen and at least one initiator to a crosslinked bead polymer,
b) phthalimidomethylating the crosslinked bead polymer from step a) with phthalimide derivatives and using the phthalimide derivative in this reaction in a ratio of 0.8 mol to 1.0 mol per mole of bead polymer,
c) converting the phthalimidomethylated bead polymer from step b) to aminomethylated bead polymer and
d) reacting the aminomethylated bead polymer from step c) with chloroacetic acid or salts thereof to give chelate resins having iminodiacetic acid groups having a functionalization level of the amino groups with acetic acid groups of 1.4 to 1.65 and the molar ratio of chloroacetic acid or salts thereof being 1.8:1 to 2.5:1 based on the amount of the aminomethylated bead polymer used.

The invention is suitable for removing fluoride from water. Therefore, the invention additionally encompasses a device for removing fluoride from water, comprising at least one aluminum-doped chelate resin containing iminodiacetic acid groups.

The device could additionally include a further chelate resin containing iminodiacetic acid groups which has been doped with calcium ions. Resins of this kind and the production thereof are known from the prior art. In the case of combination of two aluminum- or calcium-doped chelate resins containing iminodiacetic acid groups, it is firstly possible to remove fluoride from the water and secondly to reduce the amount of toxic aluminum ions which is released to the water from the aluminum-doped chelate resin containing iminodiacetic acid groups.

Water in the context of the invention is preferably aqueous solutions, emulsions or mixtures of water and organic solvents. In the aqueous component of this water, the fluorides are in dissolved form. In general, the water contains an aqueous component of at least 10% by weight of water, based on the total amount of water. More preferably, the water according to the present invention contains at least 90% by weight of water, most preferably at least 99% by weight of water, based on the total amount of water.

Water which is to be purified in the context of the invention may also, for example, arise in the extraction of soil or be wastewater. In order to use this water for further purification in the process of the invention, preference is given to conducting a filtration before this water is purified with the aluminum-doped chelate resin of the invention, containing iminodiacetic acid groups.

In general, the chelate resins of the invention are part of an ion exchange column. These columns are loaded with aqueous solutions containing fluoride by methods known to those skilled in the art.

The aluminum-doped chelate resins of the invention, containing iminodiacetic acid groups, are suitable for adsorption of fluoride ions from water. The aluminum-doped chelate resins of the invention, containing iminodiacetic acid groups, are especially suitable for removing fluoride from water for production of drinking water.

The removal of fluoride from water with the aid of the aluminum-doped chelate resin of the invention, containing iminodiacetic acid groups, can reduce the content of fluoride to below 1.5 ppm. In the context of the invention, therefore, the purification of water for production of drinking water means that the content of fluoride in the eluate of the aluminum-doped chelate resin containing iminodiacetic acid groups is reduced to values of less than 1.5 ppm.

Therefore, the invention likewise encompasses the use of aluminum-doped chelate resins containing iminodiacetic acid groups for removal of fluoride from water, especially for production of drinking water.

The aluminum-doped chelate resins of the invention, containing iminodiacetic acid groups, have a particularly high affinity for fluoride on and are therefore particularly suitable for removal of fluoride, especially at high salt contents (>10 meq/L), from water.

EXAMPLES

Example 1 a) Preparation of Monodisperse Macroporous Bead Polymer Based on Styrene, Divinylbenzene and Ethylstyrene A 10 L glass reactor is charged with 3000 g of deionized water, and a solution of 10 g of gelatin, 16 g of disodium hydrogenphosphate dodecahydrate and 0.73 g of resorcinol in 320 g of deionized water is added and mixed in. The mixture is equilibrated to 25° C. Subsequently, while stirring, a mixture of 3200 g of microencapsulated monomer droplets having a narrow particle size distribution, composed of 3.6% by weight of divinylbenzene and 0.9% by weight of ethylstyrene (used in the form of a commercial isomer mixture of divinylbenzene and ethylstyrene with 80% divinylbenzene), 0.5% by weight of dibenzoyl peroxide, 56.2% by weight of styrene and 38.8% by weight of isododecane (technical isomer mixture having a high proportion of pentamethylheptane) is given, the microcapsule consisting of a formaldehyde-hardened complex coacervate composed of gelatin and a copolymer of acrylamide and acrylic acid, and 3200 g of aqueous phase having a pH of 12 are added. The mean particle size of the monomer droplets is 460 µm.

The mixture is stirred and polymerized to completion by increasing the temperature in accordance with a temperature programme beginning at 25° C. and ending at 95° C. The mixture is cooled, washed through a 32 µm sieve and then dried at 80° C. under reduced pressure. This gives 1893 g of a polymer in bead form having a mean particle size of 440 µm, narrow particle size distribution and smooth surface.

The polymer has a chalky white appearance and a bulk density of about 370 g/L.

b) Preparation of the Monodisperse Amidomethylated Bead Polymer 2122 mL of dichloroethane, 417.1 g of phthalimide and 245.7 g of 36% by weight formalin form an initial charge at room temperature. The pH of the suspension is adjusted to 5.5 to 6 using sodium hydroxide solution. The water is then removed by distillation. Then 30.6 g of sulfuric acid are metered in. The water formed is removed by distillation. The mixture is cooled. At 30° C., 111.7 g of 65% oleum and then 371.4 g of monodisperse bead polymer prepared in accordance with process step a) from example 1 are metered in. The suspension is heated to 70° C. and stirred at this temperature for a further 6.5 hours. The reaction liquid is drawn off, demineralized water is metered in and residual dichloroethane is removed by distillation.

Yield of amidomethylated bead polymer: 1600 mL
Nitrogen content: 4.5% by weight
Dry weight: 0.473 gram per mL c) Preparation of the Monodisperse Aminomethylated Bead Polymer Into 1580 mL of amidomethylated bead polymer are metered 866 mL of demineralized water and 608.4 g of 50% by weight sodium hydroxide solution at room temperature. The suspension is heated to 180° C. and stirred at this temperature for 8 hours.

The resultant aminomethylated bead polymer is washed with demineralized water.

Yield of monodisperse aminomethylated bead polymer: 1367 mL

The total yield obtained—by extrapolation—is 1384 mL. Composition by Elemental Analysis:

Carbon: 82.7% by weight
Hydrogen: 8.4% by weight
Nitrogen: 8.0% by weight
Oxygen: 2.0% by weight
Amount of aminomethyl groups in mol per liter of aminomethylated bead polymer: 1.76 mol/L.

It can be calculated from this that, on statistical average, per aromatic ring
  originating from the styrene and divinylbenzene units—
    0.78 hydrogen atom has been replaced by aminomethyl groups.

d) Production of the Monodisperse Chelate Resin Having Chelating Groups of the Iminoacetic Acid Type Into 769 mL of demineralized water are metered, at room temperature, 730 mL of aminomethylated bead polymer from example 1c). The suspension is heated to 90° C. Into this suspension are metered, within 6 hours, 345 g of an aqueous solution having an 80% by weight content of monochloroacetic acid. At the same time, the pH of the suspension is kept at pH 9.2 by metered addition of 50% by weight sodium hydroxide solution. Subsequently, the mixture is heated to 95° C. and the suspension is adjusted to pH 10.5 with 50% by weight sodium hydroxide solution. The mixture is stirred at pH 10.5 and 95° C. for a further 6 hours.

Thereafter, the suspension is cooled. The resin is washed with demineralized water until it is free of chloride.

Yield: 1400 mL of monodisperse chelate resin
original: 96% perfect beads of 100 beads examined
After rolling test: 90% perfect beads of 100 beads examined
By swelling stability: 96% perfect beads of 100 beads examined
Total capacity of the resin: 2.1 mol/L of resin–amount of weakly acidic iminodiacetic acid groups in the chelate resin
TC/N ratio: 1.60

According to this, on statistical average, 1.60 of the two hydrogen atoms in the primary amino groups have been replaced by acetic acid groups.

Dry weight: 343 grams per liter of resin
Mean bead diameter: 610µ
Identity coefficient: 1.07 e) Doping of the Resins with Aluminum 110 mL of chelate resin from example d) are installed into a chromatography column having a frit base. A 1 liter beaker is initially charged with 550 mL of a 1 normal solution of $AlCl_3$ in demineralized water. By means of a peristaltic pump, the aluminum chloride solution is then pumped through the resin bed in downward flow and back into the beaker again for one hour.

The rate of pumped circulation is 10 BV/h, i.e. 1.1 liter/h. The resin becomes laden with aluminum and shrinks by 10% in volume to 100 mL.

Thereafter, the aluminum chloride solution is discarded and 1 liter of deionized water is introduced into the beaker. The deionized water is conveyed through the resin into the eluate at a pumping rate of 1 liter per hour (10 BV/h). The deionized water rinses excess aluminum off the chelate resin resin. Thereafter, the material is ready for operation.

Resin volume: 100 mL
100 mL of resin contain 3.2 grams of aluminum.
Mean bead diameter: 590µ
Identity coefficient: 1.07

Example 2

Fluoride Adsorption Experiment on an Aluminum-Doped Resin Having a Functionalization Level=1.5

Resin specimen A (aluminum-doped chelate resin containing iminodiacetic acid groups, prepared analogously to example 1):
First substitution level: 0.78, functionalization level 1.5,
Mean grain diameter=0.65

100 mL of the aluminum-doped resin in the abovementioned chromatography column, for downward flow operation, are connected at the feed via a pump to a 200 liter reservoir vessel and at the drain to a 200 liter collecting vessel.

The 200 liter vessel is initially charged with 200 liters of demineralized water and 28 g of $CaCl_2$, 53 g of $Na_2SO_4 \cdot 6H_2O$, 100 g of NaCl and 4.4 g of NaF are dissolved therein. The resulting ionic composition of the solution is shown in table 1.

TABLE 1

Composition of the feed solution

| Ion | Concentration [ppm] | Concentration [meq/L] |
|---|---|---|
| Calcium | 51 | 2.54 |
| Sodium | 257 | 11.17 |
| Chloride | 393 | 11.09 |
| Sulfate | 102 | 2.13 |
| Fluoride | 10 | 0.53 |
| Total | 813 | 27.46 |

At regular time intervals, the fluoride concentrations are measured in the eluate. The volume of filtrate in which en eluate concentration of <1.5 mg/L is measured is used to calculate, via mass balancing, the usable capacity (UC) reported as the mass of fluoride separated out (in g) per liter of chelate exchanger (in the aluminum form initially charged).

The results are shown in table 2:

TABLE 2

Usable capacities (UC) of resin A:

| Resin specimen | UC (g of F per L of resin) |
|---|---|
| Resin specimen A (aluminum-doped chelate resin containing iminodiacetic acid groups, prepared analogously to example 1):<br>First substitution level: 0.78<br>Functionalization level: 1.5<br>Mean grain diameter: 0.65 | 2.8 |

Comparative Example

Fluoride Adsorption Experiment on an Aluminum-Doped Resin Having a Functionalization Level=2.0

Resin specimen B (aluminum-doped chelate resin containing iminodiacetic acid groups):
First substitution level: 0.78, functionalization level=2.0, Mean grain diameter=0.65

100 mL of the aluminum-doped resin in the abovementioned chromatography column, for downward flow operation, are connected at the feed via a pump to a 200 liter reservoir vessel and at the drain to a 200 liter collecting vessel.

The 200 liter vessel is initially charged with 200 liters of demineralized water and 28 g of $CaCl_2$, 53 g of $Na_2SO_4 \cdot 6H_2O$, 100 g of NaCl and 4.4 g of NaF are dissolved therein. The resulting ionic composition of the solution is shown in table 2,

TABLE 2

Composition of the feed solution

| Ion | Concentration [ppm] | Concentration [meq/L] |
|---|---|---|
| Calcium | 51 | 2.54 |
| Sodium | 257 | 11.17 |

TABLE 2-continued

Composition of the feed solution

| Ion | Concentration [ppm] | Concentration [meq/L] |
|---|---|---|
| Chloride | 393 | 11.09 |
| Sulfate | 102 | 2.13 |
| Fluoride | 10 | 0.53 |
| Total | 813 | 27.46 |

At regular time intervals, the fluoride concentrations are measured in the eluate. The volume of filtrate in which an eluate concentration of <1.5 mg/L is measured is used to calculate, via mass balancing, the usable capacity (UC) reported as the mass of fluoride separated out (in g) per liter of chelate exchanger (in the aluminum form initially charged).

The results are shown in table 3:

TABLE 3

Usable capacities (UC) of the resin:

| Resin specimen | UC (g of F per L of resin) |
|---|---|
| Resin specimen B: (aluminum-doped chelate resin containing iminodiacetic acid groups):<br>First substitution level: 0.78<br>Functionalization level: 2.0<br>Mean grain diameter: 0.65 | 0.7 |

It is apparent from the data that resin specimen A having a second substitution level of 1.5 exhibits a fluoride absorption 3 to 4 times higher than, by comparison, resin specimen B having a substitution level of 2.

Analytical Methods
Determination of Amount of Basic Aminomethyl Groups in Aminomethylated Crosslinked Polystyrene Bead Polymer 100 mL, of the aminomethylated bead polymer are agitated down in the tamp volumeter and subsequently washed with demineralized water into a glass column. 1000 mL, of 2% by weight aqueous sodium hydroxide solution are passed through the column in the course of 1 hour and 40 minutes. De mineralized water is then passed through until 100 mL of eluate with added phenolphthalein have a consumption of 0.1 N (0.1 normal) hydrochloric acid of not more than 0.05 mL.

50 mL of this resin are admixed in a beaker with 50 L of demineralized water and 100 mL of IN hydrochloric acid. The suspension is stirred for 30 minutes and then filled into a glass column. The liquid is drained off. A further 100 mL of 1 N hydrochloric acid are passed through the resin for 20 minutes. 200 mL of methanol are then passed through. All the eluates are collected and combined and titrated with 1 N aqueous sodium hydroxide solution against methyl orange.

The number of aminomethyl groups in 1 liter of aminomethylated resin computes according to the following formula: $(200-V) \cdot 20$=mol of aminomethyl groups per liter of resin.

Determination of the Amount of Weakly Acidic Iminodiacetic Acid Groups in the Chelate Resin and Determination of the Substitution Level of the Hydrogen Atoms in the Primary Amino Groups by Acetic Acid Groups—TC/N Ratio 100 mL of exchanger are introduced into a filter column and elided with 500 mL of 3% by weight hydrochloric add within 1.5 hours. The column is then washed with demineralized water until the eluate is neutral.

50 mL of resin are taken from the amount of resin remaining and introduced into a column. 0.1 N sodium hydroxide solution is filtered through the resin. The eluate is collected in a 250 volumetric flask in each case. This liquid is titrated with 1 N hydrochloric acid against methyl orange. 0.1 N sodium hydroxide solution is filtered through the resin until 258 mL of eluate has a consumption of 24.5 to 25 mL of 1 N hydrochloric acid. Once the test has ended, the volume of exchanger in Na form is determined.

Total capacity (TC)=($X$*25−sum of $V$)−3 in mol/L of exchanger $X$=number of eluate fractions Sum of $V$=total consumption in mL of 1 N hydrochloric acid in the titration

What is claimed is:

1. An aluminum-doped chelate resin for absorption of anions, the resin comprising a polymer comprising a plurality of phenyl groups functionalized at a first substitution level of 0.6 to 1.5 with functional groups represented by the structural formula (I)

$$—CH_2—NR_2, \quad (I)$$

where each R is independently —H or —$CH_2COO^-$; the nitrogen is functionalized with acetate groups at a functionalization level of 1.4 to 1.65; and the acetate ions are conjugated with AlX, where X is any monovalent anion.

2. The resin according to claim 1, wherein the first substitution level is 0.6 to 1.2.

3. The resin according to claim 1, wherein the first substitution level is 0.7 to 0.9.

4. The resin according to claim 1, wherein:
the polymer comprises repeat units derived from at least one monovinylaromatic compound and at least one polyvinylaromatic compound; and
X is nitrate, nitrite, hydrogensulfate, hydrogencarbonate or a halide.

5. The resin according to claim 1, wherein:
the monovinylaromatic compounds include styrene, vinyltoluene, ethylstyrene, α-methylstyrene, chlorostyrene, chloromethylstyrene, alkyl acrylates or alkyl methacrylates;
the polyvinylaromatic compounds include divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate or allyl methacrylate; and
X is halide.

6. The resin according to claim 3, wherein
the monovinylaromatic compound is styrene;
the polyvinylaromatic compound divinylbenzene; and
X is chlorine.

7. A process for producing the chelate resin as claimed in claim 1, the process comprising:

converting monomer droplets composed of at least one monovinylaromatic compound, at least one polyvinylaromatic compound, at least one porogen, and at least one initiator to a crosslinked bead polymer;
phthalimidomethylating aromatic groups of the crosslinked bead polymer at the first substitution level of 0.6 to 1.5 with phthalimide derivatives to produce phthalimidomethylated bead polymer;
converting the phthalimidomethylated bead polymer to aminomethylated bead polymer to produce aminomethylated bead polymer;
reacting the aminomethyl groups of the aminomethylated bead polymer with chloroacetic acid or salts thereof to produce chelate resins having iminoacetate groups at the functionalization level of 1.4 to 1.65; and
contacting the chelate resin containing aminoacetate groups with an aluminum salt solution of a trivalent aluminum ion to produce the chelate resin.

8. The process according to claim 7, wherein:
the phthalimidomethylation reaction comprises a molar ratio of phthalimide derivative to bead polymer of 0.7 mol to 1.7 mol; and
the reaction with chloroacetic acid comprises a molar ratio of chloroacetic acid or salts thereof to aminomethylated bead polymer of 1.8:1 to 2.5:1 for functionalization of amino groups at the functionalization level of 1.4 to 1.65.

9. The process according to claim 8, wherein the phthalimidomethylation is conducted at a temperature of 60° C. to 80° C.

10. The process according to claim 9, wherein the phthalimidomethylation comprises a condensation of the phthalimide derivative with the bead polymer using a catalyst in a molar ratio of 0.1:1 to 0.45:1 in relation to the amount of bead polymer used.

11. The process as claimed in claim 10, wherein the contacting of the chelate resin containing iminoacetate groups with an aluminum salt solution comprises contacting the resin with 2 to 6 mol of aluminum based on one liter of chelate resin containing iminoacetate groups.

12. The process according to claim 7, wherein:
the phthalimidomethylation reaction comprises a molar ratio of phthalimide derivative to bead polymer of 0.7 mol to 1.35 mol; and
the reaction with chloroacetic acid comprises a molar ratio of chloroacetic acid or salts thereof to aminomethylated bead polymer of 1.8:1 to 2.5:1 for functionalization of the amino groups at the functionalization level of 1.4 to 1.65.

13. A device for removing fluoride from water, the device comprising at least one layer of at least one aluminum-doped chelate resin containing iminoacetate groups as claimed in claim 1.

14. A method for removing fluoride from water, the method comprising contacting water containing fluoride with the aluminum-doped chelate resin of claim 1 to absorb fluoride ions from the water.

* * * * *